March 25, 1924.
H. JONES
FAUCET VALVE
Filed Dec. 22, 1921
1,488,008
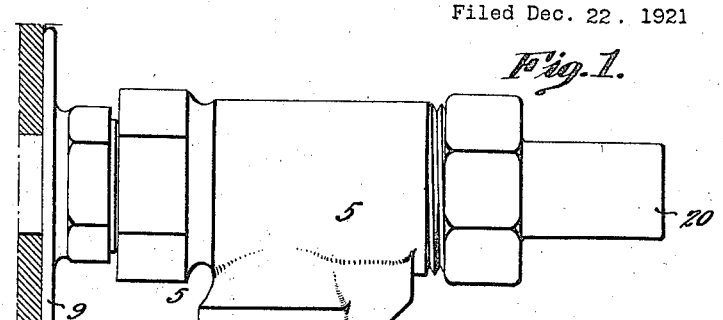
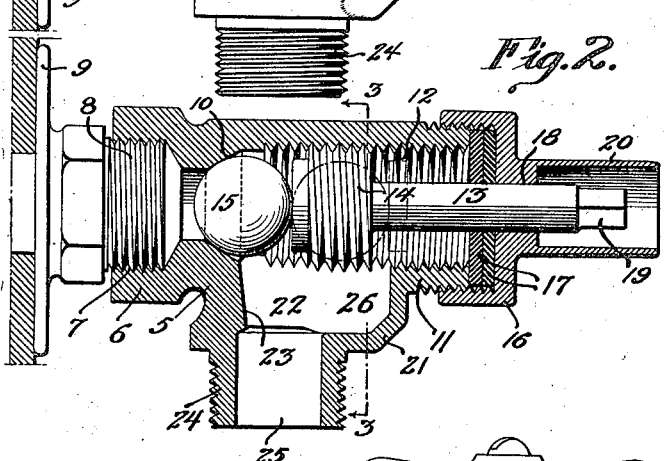
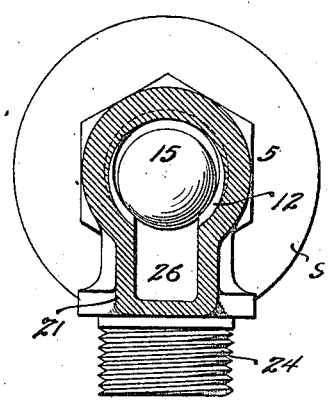
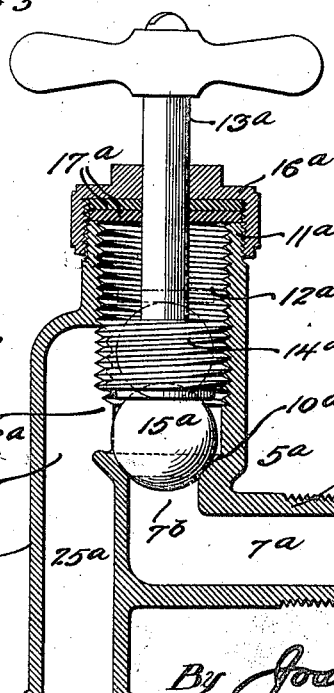
Witnesses
George A. Gruss
Augustus B. Coppes
Inventor
Henry Jones
By Joshua R. H. Potts
his Attorney Patented Mar. 25, 1924.

1,488,008

UNITED STATES PATENT OFFICE.

HENRY JONES, OF WILMINGTON, DELAWARE.

FAUCET VALVE.

Application filed December 22, 1921. Serial No. 524,107.

*To all whom it may concern:*

Be it known that I, HENRY JONES, a citizen of the United States, residing at Wilmington, in the county of New Castle and State of Delaware, have invented certain new and useful Improvements in Faucet Valves, of which the following is a specification.

One object of my invention is to provide an improved faucet valve structure including a ball valve which, when open, allows a free flow of liquid therethrough; the construction being such that the liquid flowing therefrom will be in the form of a steady compact stream which will not spread or splash.

Another object is to so arrange the parts of my improved faucet that the ball valve will be moved in such manner that it will present various portions against the valve seat so that the ball will not become worn or flattened in any one place. Thus the life of the ball as a tight fitting valve will be greatly lengthened.

A further object is to so make my improved faucet valve that it can be screwed directly to an ordinary hose coupling connection, such for example as to a screw threaded hose coupling connection used in private residences so that any person having the faucet can easily put it in position without requiring the removal of the hose coupling connection already in place.

These objects, and other advantageous ends which will be described hereinafter, I attain in the following manner, reference being had to the accompanying drawings in which Figure 1 is a side elevation of an improved faucet valve made in accordance with my invention and illustrating the same attached to an ordinary hose coupling connection such as above described, Figure 2 is a longitudinal sectional elevation illustrating the inner parts of the faucet structure shown in Figure 1, Figure 3 is a sectional view taken on the line 3—3 of Figure 2 showing the ball valve in the position shown in dot-and-dash lines in Figure 2 in which position the ball valve is off its valve seat and located so as not to interfere with the free outlet of the liquid, and Figure 4 is a sectional elevation showing a different form of faucet body; the same also illustrating features of my invention.

Referring to the drawing and particularly to Figures 1, 2 and 3, the faucet body is shown at 5; said faucet body having an end 6 provided with an internal screw threaded passage 7; the threads being cut preferably so as to fit the standard hose coupling threads 8 of a hose coupling connection 9 which serves as the water or other liquid supply.

A valve seat 10 is formed in axial alignment with the screw threaded passage 7 and flares in a direction toward the opposite end 11 of the faucet body. A screw threaded cavity 12 leads outward from the valve seat 10 in axial alignment therewith; said cavity extending through the end 11. A valve closing stem 13 has an externally screw threaded head 14 adapted to engage a ball valve 15 and hold it against the seat 10. A screw threaded cap 16 is screwed on the end 11 of the faucet body 5; said end having external screw threads adapted to co-act with the internal screw threads of the cap and I preferably locate washers or gaskets 17 between the inner surface of the cap and the extreme outer surface of the end 11 so as to form a seal against leaking, said stem 13 extending through the gaskets and through a hole 18 in the cap. The outer end of the stem preferably has an angular portion 19 for engagement with any suitable actuating key and this portion 19 is enclosed in an outwardly projecting sleeve 20 which is formed integral with the cap 16.

The faucet body 5 has a depending portion 21 providing a recess or chamber 22 which communicates with the screw threaded cavity 12; the side wall 23 leading downward from the bottom of the valve seat, as clearly shown in Figure 2. This recess or chamber is extended longitudinally and at its top interrupts the screw threads of the cavity 12 as clearly shown in Figure 3. The faucet body 5 has a liquid outlet portion 24 which depends from the portion 21 and provides an outlet passage 25; this outlet passage being of less diameter than the length of the chamber 22 so that the chamber has a portion 26 extending in the direction of the length of the faucet body beyond the outlet passage 25.

To open the valve, the stem 13 is turned by any suitable key which can be projected into the sleeve 20 for engagement with the part 19 and the head 14 will be moved toward the end 11 and the pressure of the liquid will then force the valve within the cavity 12 into a position over the extension 26 into a position shown in dot-and-dash lines in Figure 2 and in full lines in Figure 3.

During this action the ball valve will roll over the screw threads of the cavity 12 and will be vibrated and will project partway into the extension 26. The liquid, such as the water, will first rush into the chamber which serves as an equalizing chamber, then out through the passage 25 in a steady compact stream which does not spread or splash laterally.

During the closing movement of the ball valve, the latter will be pushed lengthwise of the faucet body and will also be elevated to the extent which it had previously been lowered owing to the interruption in the screw threads of the cavity 12 by the chamber 22 and this action of the ball together with the spinning or vibrating action of the ball will allow it to turn so that it will practically never present similar portions for engagement with the seat 10 and thus the ball valve will be kept round and free of flattened or worn portions.

In the form of my invention shown in Figure 4, the faucet body $5^a$ has a screw threaded horizontally extending end $6^a$ for attachment to a liquid conduit such as a pipe, and this end portion includes a passage $7^a$ which leads horizontally and communicates with an upwardly extending passage $7^b$ which at its top terminates in a valve seat $10^a$ for the ball valve $15^a$. The body portion has a screw threaded cavity $12^a$ leading upward from the valve seat $10^a$ through the end $11^a$ and through this cavity projects an operating stem $13^a$ having a screw threaded portion $14^a$ adapted to engage the ball valve and hold it against the seat $10^a$. The cavity $12^a$ at its opposite side is interrupted by a recess or chamber $22^a$ which communicates with the outlet passage $25^a$ of the liquid outlet 24; this liquid outlet in the present instance being of considerable length; the outlet passage being contracted at $25^b$ so as to be considerably less in cross sectional area than the cross sectional area of the opening provided by the chamber $22^a$ when the valve is raised to the position shown in dot-and-dash lines when the valve is open. Thus the water or liquid from the passage $7^a$ will first pass into the comparatively large and longitudinally extending chamber $22^a$ where it will be equalized and then pass outward through the outlet passage $25^a$. The end $11^a$ is closed by a cap $16^a$ which is screwed thereon and through which the stem $13^a$ passes; washers $17^a$ preferably being interposed between the end and the inner surface of the cap.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A valve including a body having a valve seat, an inlet passage on one side of the valve seat, a valve stem cavity on the other side, a chamber off-set from the cavity and communicating therewith and an outlet passage communicating with the chamber adjacent the seat, and means in the valve stem cavity for engaging the valve seat to close the inlet passage.

2. A valve including a body having a valve seat, an inlet passage on one side of the valve seat, a threaded valve stem cavity on the other side, a chamber at the side of the cavity communicating therewith and interrupting the threads and an outlet passage communicating with the chamber; a ball in the cavity adapted to engage the seat, and a threaded valve stem in the cavity for moving the ball into engagement with the seat to close the inlet passage.

3. A valve including a body having a valve seat, an inlet passage on one side of the valve seat in alignment therewith, a threaded valve stem cavity on the other side of the valve seat in alignment therewith, a chamber at one side of the cavity communicating therewith and interrupting the threads and an outlet passage communicating with the chamber; a ball in the cavity adapted to engage the seat, and a threaded valve stem in the cavity for moving the ball into engagement with the seat to close the inlet passage.

4. A valve including a body having a valve seat, an inlet passage on one side of the valve seat, a valve stem cavity on the other side, a chamber off-set from the cavity extending lengthwise thereof and communicating therewith and an outlet passage communicating with the end of the chamber adjacent the seat; a ball in the cavity adapted to engage the valve seat, and means in the cavity for moving the ball into engagement with the valve seat to close the inlet passage.

5. A faucet body having an inlet passage and a valve seat in alignment therewith; a ball valve for engagement with said valve seat, said faucet body having a screw threaded cavity in alignment with said valve seat and a chamber communicating with said cavity and interrupting the screw threads, said faucet body having an outlet passage communicating with said chamber, the chamber having a part projecting beyond the opening into said outlet passage, said ball valve when off the valve seat being adapted to position itself adjacent the projecting portion of said chamber; and means in screw threaded connection with the screw threads of said cavity and adapted to move said ball valve into closing engagement with said valve seat; substantially as described.

In testimony whereof I have signed my name to this specification in the presence of two subscribing witnesses.

HENRY JONES.

Witnesses:
   EVELYN CROMPTON,
   CHAS. E. POTTS.